United States Patent

Song

[11] 3,887,516
[45] June 3, 1975

[54] HINDERED TRIS (META-HYDROXYBENZYLTHIO)-S-TRIAZINE ANTIOXIDANTS

[75] Inventor: John Song, Bound Brook, N.J.

[73] Assignee: American Cyanamid Company, Stamford, Conn.

[22] Filed: Oct. 20, 1972

[21] Appl. No.: 299,566

Related U.S. Application Data

[62] Division of Ser. No. 199,341, Nov. 16, 1971, Pat. No. 3,723,428.

[52] U.S. Cl......... 260/45.8 N; 252/402; 260/248 R; 260/45.8 SN
[51] Int. Cl. .............................................. C08f 45/58
[58] Field of Search.... 252/402; 260/248 R, 45.8 N, 260/45.8 SN

[56] References Cited
UNITED STATES PATENTS

| | | | |
|---|---|---|---|
| 3,423,327 | 1/1969 | Tracy................................. | 252/402 |
| 3,465,029 | 9/1969 | Beirne............................. | 252/402 X |
| 3,636,031 | 1/1972 | Drake et al...................... | 252/402 X |
| 3,652,561 | 3/1972 | Dexter et al.................... | 252/402 X |
| 3,751,472 | 8/1973 | Wheeler........................... | 252/402 X |

*Primary Examiner*—Stephen J. Lechert, Jr.
*Attorney, Agent, or Firm*—Philip Mintz

[57] ABSTRACT

Compounds of the formula:

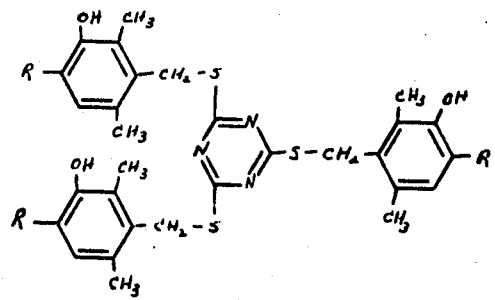

wherein R is a branched chain alkyl group containing three to about 12 carbon atoms are provided. These compounds are useful as antioxidants in organic substrates, such as polyolefins, rubber, etc. They can be prepared by reacting three moles of 4-alkyl-3-hydroxy-2,6-dimethylbenzyl chloride with 1 mole of 2,4,6-trimercapto-s-triazine or by reacting three moles of 4-alkyl-3-hydroxy-2,6-dimethylbenzyl mercaptan with one mole of cyanuric chloride.

5 Claims, No Drawings

HINDERED TRIS (META-HYDROXYBENZYLTHIO)-S-TRIAZINE ANTIOXIDANTS

This is a division of application Ser. No. 199,341, filed Nov. 16, 1971, now U.S. Pat. No. 3,723,428.

This invention relates to novel compounds useful for inhibiting oxidative degradation of organic materials. More particularly, it relates to compounds of the formula:

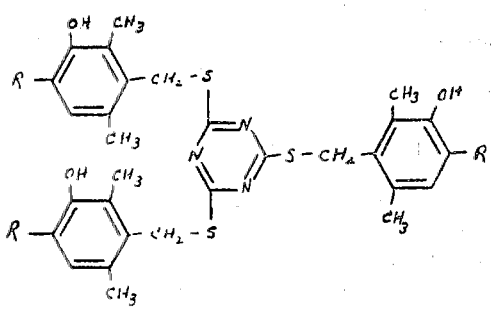

wherein R is a branched chain alkyl group containing three to about 12 carbon atoms. This invention also relates to the use of such compounds to inhibit oxidative degradation of organic materials subject thereto.

It is well known that numerous organic materials tend to deteriorate upon exposure to oxygen in air. Among such materials are polyolefins, ABS resins, polyamides, polyacetals, polystyrene, impact polystyrene, natural and synthetic rubbers including ethylene-propylene copolymers and carboxylated latices, fats, oils, greases, gasoline, etc. It is also well known to incorporate various additives (antioxidants) into such materials to inhibit oxidative degradation thereof. This invention arises out of the continuing search for new compounds which will be superior antioxidants for such materials.

The present invention is based on the discovery that these novel compounds, as defined in the above formula, in addition to inhibiting oxidation of organic materials, such as those mentioned above, possess outstanding resistance to extraction by boiling water, a property which has considerable importance when used in plastic materials in applications such as fibers, washing machine agitators, dish washer parts, and the like, where contact with hot water is likely.

In the compounds of the present invention, the three nitrogens of the s-triazine are each connected to a hindered phenolic moiety through a thiomethylene group. It will be noted that the hydroxyl group of each phenolic moiety is positioned meta with respect to the thiomethylene group attaching the phenolic moiety to the s-triazine. It is critically important that this hydroxyl group be located in the meta position to avoid discoloration of the substrate in which these compounds are used and to provide a high degree of antioxidant protection to the substrate. It will also be noted that all positions ortho and para to the hydroxyl group are substituted, one ortho position with a branched chain alkyl group and the other two such positions with methyl groups. Thus, this phenolic moiety is hindered by the branched chain alkyl substituent adjacent to the hydroxyl group.

Illustrative of the branched chain alkyl groups represented by R in the position ortho to the phenolic hydroxy group in the compounds of this invention are isopropyl, t-butyl, sec-butyl, t-amyl, sec-heptyl, sec-octyl, t-octyl, t-nonyl (1,1-dimethylheptyl), $\alpha,\alpha$-dimethylbenzyl, methylcyclopentyl, methyl cyclohexyl, and the like.

These compounds are readily prepared by known procedures, such as the reaction of one mole of 2,4,6-trimercapto-s-triazine with three moles of an appropriate 4-alkyl-3-hydroxy-2,6-dimethylbenzyl chloride or the reaction of one mole of cyanuric chloride with three moles of an appropriate 4-alkyl-3-hydroxy-2,6-dimethylbenzyl mercaptan. The benzyl chloride utilized can be prepared from the corresponding 2,4-dimethyl-6-alkylphenol by introducing the chloromethyl group into the 3-position by reaction with hydrochloric acid and formaldehyde or by reaction with methylal in the presence of hydrochloric acid and sulfuric acid according to the procedure of R. Wegler and E. Regel, Makromol. Chem. 9, 1 (1952). The corresponding benzyl mercaptan utilized can be prepared by dissolving the appropriate benzyl chloride compound in tetrahydrofuran, adding at least one molecular equivalent of an acid acceptor, such as triethylamine, and bubbling in hydrogen sulfide.

These compounds (1) are non-discoloring, (2) exhibit a high degree of antioxidant protection to the substrate, and (3) are resistant to hot water extraction from the substrate, and are especially useful for inhibiting oxidative degradation of organic materials normally subject to deterioration upon exposure to oxygen, such as those mentioned above. These compounds may be incorporated into the various organic materials to be protected by any of the standard techniques, including stirring, milling, screw extruding, Banbury mixing, swelling, etc. These compounds are effective over a wide concentration range of about 0.01 to about 5.0 percent based on weight of material to be protected. In polypropylene, a preferred use, they are preferably used at a concentration between 0.05 and 1.0 percent based on weight of polyolefin. After incorporating these compounds into polymeric materials, during which other ingredients such as fillers, plasticizers, pigments, light absorbers, etc. may be added, the polymer composition is formed into useful shapes by molding, casting, spinning, extruding, injection molding, or other shaping procedures. In polypropylene, the antioxidant activity of these compounds can be greatly enhanced by concurrent use therein of esters of thiodipropionic acid, such as dilauryl and distearyl thiodipropionate.

Oxidative deterioration of polypropylene and other similar oxidizable plastic materials is evident from the embrittlement which occurs on exposure to atmospheric oxygen. The extent to which the antioxidant protects against deterioration is measured in an accelerated test by determining the hours to embrittlement at 140°–150° C. when a specimen containing the antioxidant is exposed in a forced draft oven at this temperature.

Extractability of the antioxidant from the plastic by hot water is determined by refluxing compression molded films containing the antioxidant in water for a predetermined period of time and then aging the specimens in a forced-draft oven as described above.

The invention is more fully described in the following illustrative examples.

EXAMPLE 1

2,4,6-TRIS(4-t.BUTYL-3-HYDROXY-2,6-DIMETHYLBENZYLTHIO)-s-TRIAZINE

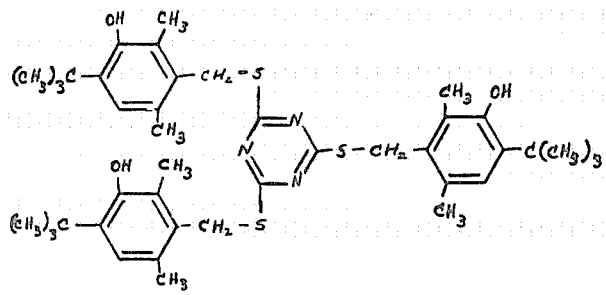

4-Tert.-butyl-3-hydroxy-2,6-dimethylbenzyl mercaptan (22.4 grams, 0.1 mole) was added to 5.6 grams (0.1 mole) of potassium hydroxide in 125 ml. ethanol. Cyanuric chloride (5.5 g., 0.03 mole) was added, the mixture heated to reflux for a period of 4 hours, cooled, and 6.65 grams of potassium chloride filtered off. The filtrate afforded 23 grams of semi-solid residue which, on treatment with acetone, gave 9.3 grams of product, m.p. 123°–128° C. Further purification from acetone, followed by recrystallization from 300 ml. methanol-water (2:1) gave 5 grams of colorless crystals, m.p. 130°–133° C. The infrared spectrum was identical with a sample prepared from reacting 2,4,6-trimercapto-s-triazine with 4-tert.-butyl-3-hydroxy-2,6-dimethylbenzyl chloride.

| Analysis: | Carbon | Hydrogen | Nitrogen | Sulfur |
|---|---|---|---|---|
| Calc: | 67.47 | 7.63 | 5.62 | 12.85 |
| Found: | 67.26 | 7.58 | 5.47 | 12.66 |

EXAMPLE 2

2,4,6-TRIS(3,5-DI-t-BUTYL-4-HYDROXYBENZYLTHIO)-s-TRIAZINE

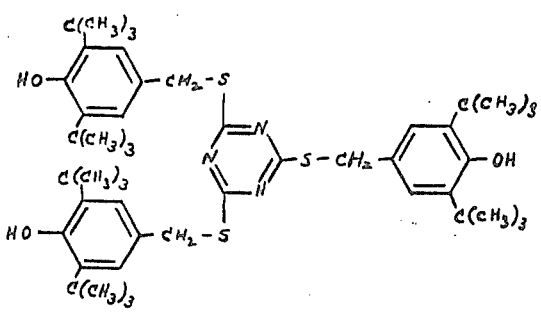

Following the general procedure of Example 1 and using 3,5-di-t-butyl-4-hydroxybenzyl mercaptan, potassium carbonate, and dioxane as solvent, there was obtained 2,4,6-tris(3,5-di-t-butyl-4-hydroxybenzylthio)-s-triazine as a colorless solid. This compound, which is disclosed in British Pat. Specification No. 977,589 in Example 9, will hereinafter be referred to as "control compound."

EXAMPLE 3

APPLICATION IN POLYPROPYLENE

Sample preparation: Antioxidants were incorporated into unstabilized polypropylene at concentrations shown in Table I by milling at 170°–180° C. on a two-roll laboratory mill. As indicated, some samples also contained distearyl thiodipropionate (STDP). The milled samples were then compression molded into films 15 mils thick.

Oven aging: The films were aged in a forced draft oven at 150° C. and the time (hours) to embrittlement recorded.

Extractability: Films containing the antioxidant were refluxed in 200 ml. water for 7 hours (one cycle). The water was replaced at the end of each cycle until six cycles (42 hours) of boiling water extractions was completed. The films were then aged as described above.

A second set of films was exposed to 15 cycles (105 hours) of boiling water and oven aged as above. The oven aged stability of the films after boiling water treatment is a measure of the extractability of the compound.

Table I

| Additive Concentration (%) and Number of Cycles of Boiling Water Extractions | Oven Aging at 150°C. (Hours to Embrittlement) | |
|---|---|---|
| | Compound of Example 1 | Control Compound |
| None | <4 | <4 |
| 0.05 | 27–31 | 50–96 |
| 0.10 | 552–536 | 545–553 |
| 0.20 | 839–855 | 833–841 |
| 0.02 + 0.25 STDP | 1360–1381 | 385–432 |
| 0.10 + 0.25 STDP | 2345–2353 | 1331–1344 |
| 0.2 with 6 cycles | 797–813 | 227–269 |
| 0.2 with 15 cycles | 583–597 | 64–75 |
| 0.1 + 0.25 STDP with 6 cycles | 1643–1651 | 0–47 |
| 0.1 + 0.25 STDP with 15 cycles | 503–519 | 8–10 |

The data shown in Table I indicate that the compound of Example 1, a compound of this invention, when used alone in polypropylene is about equivalent in activity to the prior art compound which is closest in structure. When tested in combination with distearylthiodipropionate, the compound of this invention is superior. Of considerable significance, however, is the fact that, after treatment in boiling water, samples containing the compound of this invention retain much of their resistance to oxidation whereas the samples containing the prior art compound lose nearly all their protection. This is highly significant for those uses where the products to be protected from oxidation are exposed to hot water, such as fibers subject to laundering, dyeing, etc., washing machine agitators, etc.

I claim:

1. A composition comprising an organic material which tends to deteriorate upon exposure to oxygen containing, in an amount effective to inhibit oxidative degradation thereof, a compound of the formula:

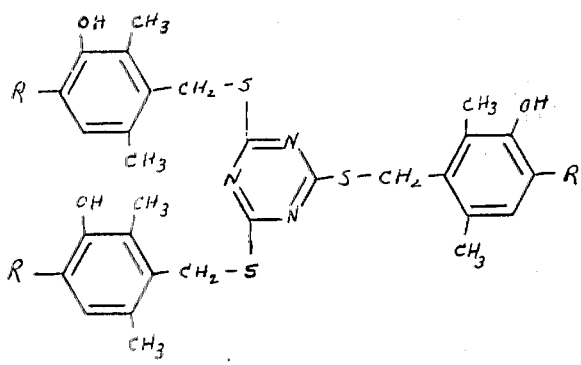

wherein R is a branched chain alkyl containing three to about 12 carbon atoms.

2. A composition as defined in claim 1 wherein R is tertiary butyl.

3. A composition as defined in claim 1 wherein said organic material is a polyolefin.

4. A composition as defined in claim 1 wherein said organic material is polypropylene.

5. A composition as defined in claim 4 which also contains an ester of thiodipropionic acid.

* * * * *